United States Patent
Hamanishi et al.

[11] 4,206,971
[45] Jun. 10, 1980

[54] REAR CONVERSION LENS

[75] Inventors: Yoshinari Hamanishi, Tokyo; Soichi Nakamura, Kamakura, both of Japan

[73] Assignee: Nippon Kogaku K.K., Tokyo, Japan

[21] Appl. No.: 928,423

[22] Filed: Jul. 27, 1978

[30] Foreign Application Priority Data

Jul. 29, 1977 [JP] Japan .................. 52-90508

[51] Int. Cl.² .............. G02B 15/02; G02B 9/34; G02B 9/60
[52] U.S. Cl. .................... 350/183; 350/220; 350/216; 350/214
[58] Field of Search ............... 350/183, 216, 220

[56] References Cited

U.S. PATENT DOCUMENTS

| | | | |
|---|---|---|---|
| 3,877,796 | 4/1975 | Yabe et al. | 350/215 |
| 4,129,359 | 12/1978 | Momiyama | 350/220 X |
| 4,154,508 | 5/1979 | Nakamura | 350/220 X |

FOREIGN PATENT DOCUMENTS

51-12421  4/1976  Japan.

Primary Examiner—Conrad J. Clark
Attorney, Agent, or Firm—Shapiro and Shapiro

[57] ABSTRACT

A rear conversion lens comprises a divergent forward lens group comprising three components and a divergent rearward lens group comprising two components. The three components forming the forward lens group are, in order from the object side, a biconvex positive lens, a biconcave negative lens with its more curved surface facing the image side, and a positive lens with its more curved surface facing the object side. The two components forming the rearward lens group are, in order from the object side, a biconcave negative lens with its more curved surface facing the image side and a biconvex positive lens with its more curved surface facing the object side.

5 Claims, 10 Drawing Figures

— SPHERICAL ABERRATION
--- SINE CONDITION

ASTIGMATISM

DISTORTION

— SPHERICAL ABERRATION
--- SINE CONDITION

ASTIGMATISM

DISTORTION

REAR CONVERSION LENS

BACKGROUND OF THE INVENTION

1. Field of the Invention

This invention relates to a rear conversion lens mountable to the image side of a photographic lens to increase the focal length thereof.

2. Description of the Prior Art

A rear conversion lens is very convenient in that it is simply mountable to the image side of a conventional lens to thereby enable the latter lens to be used as a lens of greater focal length. Also, if the rear conversion lens is small in size and light in weight, it increases its attractiveness as an interchangeable lens and becomes easier to operate.

A conventional rear conversion lens of such type has employed a negative lens system of strong refractive power which has tended to increase the Petzval sum in the negative sense, and also to increase astigmatism as well as the other remaining aberrations. Thus, however high may be the performance of the master or conventional photographic lens to which the conversion lens is attached, the performance thereof has tended to be greatly diminished when a rear conversion lens is mounted thereto. Moreover, if the master lens is of a large aperture ratio, the spherical aberration and the other various aberrations must be well corrected to permit a sufficient quantity of light to pass through the rear conversion lens, and if it is desired to make the rear conversion lens itself of a small size, the various aberrations become more pronounced, and this has made it difficult to design a compact lens which is usable with a master lens of large aperture ratio.

SUMMARY OF THE INVENTION

It is an object of the present invention to provide a rear conversion lens of compact construction which maintains high performance even if mounted to a photographic lens of large aperture ratio, and more particularly to provide a rear conversion lens having a focal length magnification of 1.4 and which is usable with lenses of very large aperture ratio.

The invention will become more fully apparent from the following detailed description thereof taken in conjunction with the accompanying drawings.

DESCRIPTION OF THE PREFERRED EMBODIMENTS

Figure 1:
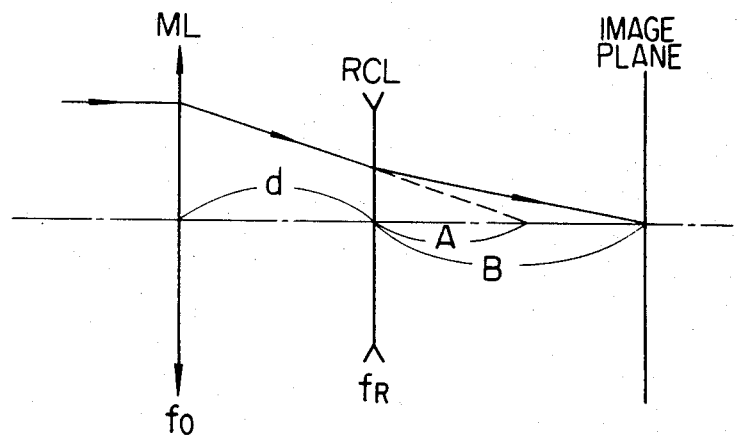
FIG. 1 is a schematic representation showing the principle of a conventional rear conversion lens.

Before the present invention is described, description will first be made of the general principle of a rear conversion lens (hereinafter referred to as "RCL"). When, as shown in FIG. 1, a RCL of focal length $f_R$ ($<0$) is mounted to the image side of a master or conventional lens (hereinafter referred to as ML) of focal length $f_0$, the composite focal length $f$ of the combined lenses being:

$$f = f_0 \cdot \beta,$$

where $\beta$ is the magnification of the focal length provided by RCL, and if F-number of the ML is $F_0$, the composite F-number is:

$$F = F_0 \cdot \beta.$$

Let the distance between the principal points of ML and RCL be d. Then, the distance A from the object point with respect to RCL, namely, the distance from the image point of ML to the principal point of RCL, is:

$$A = f_0 - d.$$

Let the distance from the principal point of RCL to the final image point be B. Then, the following relation is established:

$$\frac{1}{B} = \frac{1}{f_R} + \frac{1}{A}.$$

Thus, the magnification $\beta$ of RCL is expressed as:

$$\beta = \frac{B}{A} = 1 - \frac{B}{f_R}.$$

Here it will be seen that if A is increased with $\beta$ constant, B is also increased and $f_R$ is also increased. Therefore, by increasing A, it is possible to decrease the value of the negative Petzval sum of RCL and to increase the radius of curvature of each lens component, so that correction of aberrations can be effected easily. Generally, however, an interchangeable lens for a single lens reflex camera has the limitation that the back focus length cannot be shortened beyond a certain value and thus, the value of A cannot be increased beyond a certain degree, and the prior art has had to be satisfied with aggravation of various aberrations. This has been the major drawback of existing RCL.

According to the invention, a RCL is made of two lens groups and the refractive power distribution and other specific factors in each group are designed to improve the Petzval sum, thus achieving the intended purposes.

Figure 2:
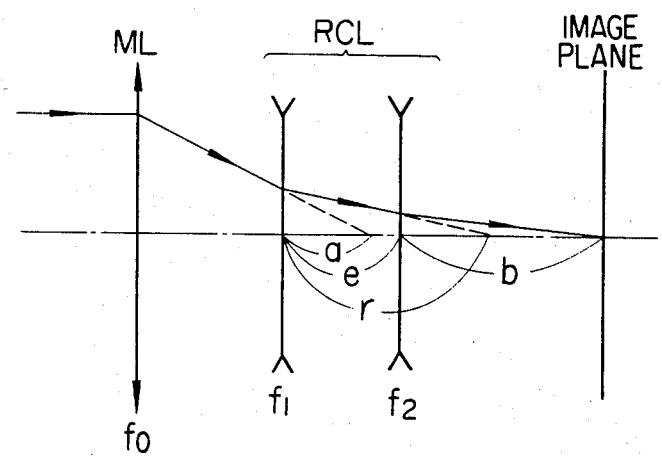
FIG. 2 is a schematic representation showing the principle of a rear conversion lens according to the invention.

Reference is now made to FIG. 2 to illustrate the principle of an RCL according to the invention. Let $f_1$ be the focal length of the forward lens group, or simply forward group, of the RCL which comprises two lens groups, $f_2$ the focal length of the rearward lens group, or rearward group, and e the distance between the principal points of the two groups. Then, the composite focal length $f_R$ of the RCL is:

$$\frac{1}{f_R} = \frac{1}{f_1} + \frac{1}{f_2} - \frac{e}{f_1 \cdot f_2}.$$

Also, let a be the distance from the principal point of the forward group with respect to the object point of the forward group, namely, to the image point of the master lens ML, b the distance from the principal point of the rearward group to the final image point of the RCL, and r the distance from the principal point of the forward group to the image point of the forward group. Then, the relations between the images formed by the forward and rearward groups are:

$$\frac{1}{-a} + \frac{1}{r} = \frac{1}{f_1}, \text{ and}$$

$$\frac{1}{-r+e} + \frac{1}{b} = \frac{1}{f_2}.$$

The magnification $\beta$ of the RCL is:

$$\beta = \frac{r}{a} \cdot \frac{b}{r-e}.$$

On the other hand, assume that the forward and the rearward groups of the RCL are formed by k and h single lenses, respectively, and let $f_{Pi}$ be the focal length of each lens components, and $n_i$ the refractive index of each lens component. Then, the apparent refractive indices $N_1$ and $N_2$ of the forward and rearward groups are defined as follows:

$$\frac{1}{f_1 \cdot N_1} = \sum_{i=1}^{k} \frac{1}{f_{Pi} \cdot N_i}, \text{ and}$$

$$\frac{1}{f_2 \cdot N_2} = \sum_{i=1}^{h} \frac{1}{f_{Pi} \cdot N_i}.$$

In this case, the Petzval sum P is expressed as:

$$P = \frac{1}{f_1 \cdot N_1} + \frac{1}{f_2 \cdot N_2}.$$

The foregong equations may be rearranged as follows:

$$r = \frac{a(a\beta N_1 - bN_2)}{aN_1 - bN_2 - abPN_1N_2};$$

$$f_1 = \frac{ar}{a-r};$$

$$e = r - \frac{br}{a\beta}; \text{ and}$$

$$f_2 = \frac{br}{r - a\beta}.$$

Thus, if $\beta$, P, a, b, $N_1$ and $N_2$ are given, r is obtained to determine the values of the basic structural factors $f_1$, $f_2$, and e of the RCL in succession.

In accordance with such principle, the magnification of RCL is defined as $\beta = 1.4$ and the apparent refractive indices are given the following ranges:

$-50.0 < N_1 < 0.0$, and $1.0 < N_2 < 3.5$, and the Petzval sum is given the following range:

$|P| < 0.002$;

and the back focus required at minimum as RCL may be secured, whereby the basic construction is determined with the premise of $a < b$ satisfied.

Specifically, the RCL of the invention is constructed as follows: the forward group is made as a divergent group comprising three components which are, in order from the object side, a biconvex positive lens, a biconcave negative lens with its more curved surface facing the image side, and a positive lens with its more curved surface facing the object side; and the rearward group is made as a divergent lens group comprising two components, which are a biconcave negative lens with its more curved surface facing the image side and a biconvex positive lens with its more curved surface facing the object side. Specifically, if $f_{Pi}$ is the focal length of the ith lens from the object side, $q_i$ the shape factor thereof, $n_i$ the refractive index thereof, and $\nu_i$ the Abbe number thereof, then, it is desirable that each of the following conditions be satisfied:

$$1.5 < \left| \frac{f_{P1}}{f_{P2}} \right| < 3.2; \quad (1)$$

$$1.5 < \left| \frac{f_{P3}}{f_{P2}} \right| < 3.2; \quad (2)$$

$$1.0 < \left| \frac{f_{P5}}{f_{P4}} \right| < 2.5; \quad (3)$$

$$-0.2 < q_1 < 0.1; \quad (4)$$

$$0.4 < q_3 < 2.0; \quad (5)$$

$$0.1 < q_5 < 2.2; \quad (6)$$

$$\frac{n_1 + n_3}{2} \leq n_2; \quad (7)$$

$$n_4 \geq n_5; \text{ and} \quad (8)$$

$$\frac{\nu_1 + \nu_3}{2} \leq \nu_2. \quad (9)$$

Here, it is to be understood that the shape factor q is defined by $$\frac{r_b + r_a}{r_b - r_a},$$

where $r_a$ is the radius of curvature of the object side surface of that lens and $r_b$ is the radius of curvature of the image side surface of that lens.

The above conditions will hereinafter be considered in detail. Conditions (1) and (2) limit the refractive power distribution of each lens in the foward group and show that the powers of three lenses—positive, negative and positive—as the convergent forward group are disposed substantially symmetrically. Condition (3) limits the proper power distribution of two lenses—negative and positive—in the rearward group and shows that this group has a divergency due to synthesization. As the values of conditions (1) and (2) become smaller, the positive power becomes relatively stronger and if the lower limit is exceeded, the spherical aberration becomes greater and undercorrected and longitudinal achromatism becomes overcorrected.

In the rear conversion lens of the present invention which comprises two divergent forward and rearward groups, it is best to correct the longitudinal chromatic aberration chiefly by the forward group and to correct the lateral chromatic aberration chiefly by the rearward group, but there is a conflict between these two aberrations so that if the lower limit is exceeded, the lateral chromatic aberration cannot fully be corrected even by the rearward group. On the other hand, if the values of the two conditions become greater, the negative refractive power becomes relatively stronger and if the upper limit is exceeded, the lenses of the forward and rearward groups mechanically interfere with each other to make it impossible to realize the intended effect. Also, the Petzval sum necessarily becomes too great in the negative sense to make it difficult to effect good correction of the aberrations. If the value of condition (3) becomes smaller, the positive refractive power becomes relatively stronger and if the lower limit is exceeded, astigmatism will be greatly undercorrected and the distortion is also too great in the negative sense, thus making it impossible to secure a sufficient value of back focus length. If the upper limit is exceeded, the astigmatism will be overcorrected with attendant great deviation from the sine conditions and with the coma also being great.

Conditions (4), (5) and (6) define appropriate lens shape of two positive lenses in the forward group and the positive lens in the rearward group under the aforementioned refractive power arrangement. If the lower limit of condition (4) is exceeded, the principal point of the positive lens on the object side shifts inwardly of RCL and this tends to create mechanical interference with the master lens. To avoid this, the value of a mentioned in connection with FIG. 2 can be reduced, but this will result in a stronger refractive power of the entire basic construction, and it becomes difficult to correct the various aberrations. If the upper limit of condition (4) is exceeded, the spherical aberration becomes overcorrected and the deviation from the sine condition becomes pronounced in the positive sense, thus increasing generation of coma. If the lower limit of condition (5) is exceeded, distortion will be stronger toward the positive sense. Generally, when an RCL like the present invention is mounted to a ML, the entire lens system becomes similar to a telephoto type system, and the value of the positive distortion is more and more increased and cannot be made smaller than the lower limit. On the other hand, if the upper limit of this condition is exceeded, the astigmatism and curvature of image field become undercorrected and the lateral chromatic aberration becomes overcorrected so that good corrections cannot be maintained. If the lower limit of condition (6) is exceeded, the positive distortion becomes greater and astigmatism becomes overcorrected. If the upper limit of this condition is exceeded, the principal point of this positive lens shifts into the RCL, thus making it difficult to sufficiently secure the back focus of the RCL. To avoid this, the value of b mentioned in connection with FIG. 2 may be increased, but this would cause the entire basic construction to be unreasonable, with the result that good correction of aberrations cannot be achieved.

Conditions (7) and (8) are indispensable for the improvement of the Petzval sum and indicate that glass of low refractive index may be used for the positive lenses and glass of high refractive index may be used for the negative lenses, because the RCL as a whole has a negative refractive power. If these conditions are departed from, the value of the Petzval sum cannot be minimized to a desired small value, and the astigmatic difference becomes great. Condition (9) is intended to achieve the longitudinal achromatism in the forward group and indicates that glass of greater Abbe number may be used for the negative lenses and glass of smaller Abbe number may be used for the positive lenses, because the forward group has a negative refractive power.

By the specific construction as hereinbefore described, a compact rear conversion lens can be achieved which has a focal length magnification of 1.4, and which is mountable to a photographic lens having a large relative aperture. More specifically, even if this rear conversion lens is mounted to a lens of large relative aperture having a focal length of 200 mm and F/2.0, there can be provided a telephoto lens of a large relative aperture having a focal length of 280 mm and F/2.8, or even if this rear conversion lens is mounted to a lens having a focal length of 600 mm and F/4.0, there can be provided an ultra-telephoto lens of large relative aperture having a focal length of 840 mm and F/5.6, both lenses having well corrected aberrations.

Figure 3:
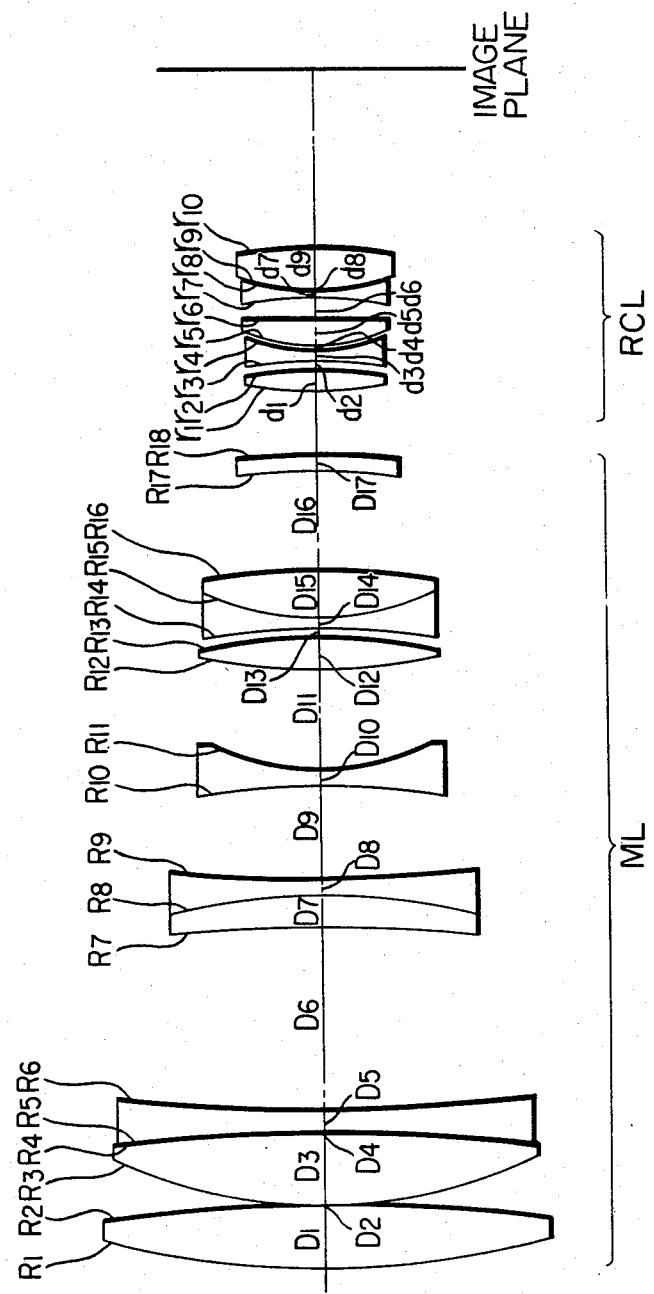
FIG. 3 shows the lens arrangement of a first embodiment of a rear conversion lens according to the invention as mounted on a master lens.
Figure 5A:
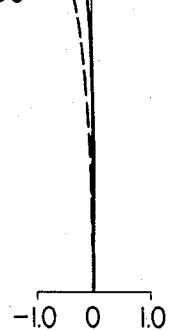
FIGS. 5A–5C and 6A–6C show various aberration charts for rear conversion lenses made according to the first and second embodiments of the invention when mounted on a master lens of focal length 200 mm and F/2.0.
Figure 5B:
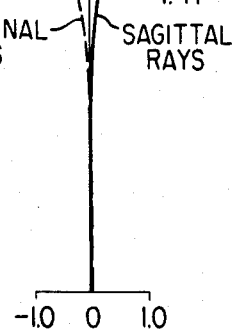
Figure 5C:
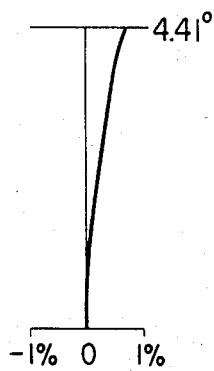

Now, specific embodiments of the invention will be described. FIG. 3 shows the lens arrangement when the RCL of a first embodiment is mounted to an ML having a focal length of 200 mm and F/2.0. This is a basic embodiment of the invention and is compactly constructed, with the forward group consisting of positive, negative and positive individual lenses and with the rearward group consisting of negative and positive individual lenses. FIGS. 5A-5C illustrate the various aberrations when the lens of this embodiment is mounted to an ML, and it will be seen that both spherical aberration and astigmatism are maintained very well.

Figure 4:
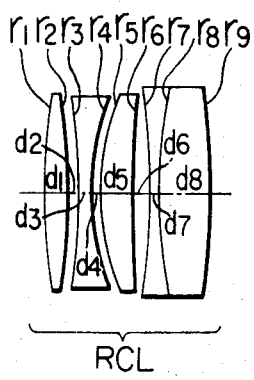
FIG. 4 shows the lens arrangement of a second embodiment of the invention.
Figure 6A:
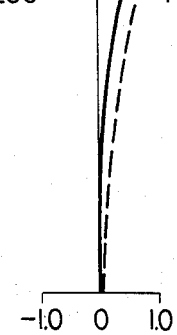
Figure 6B:
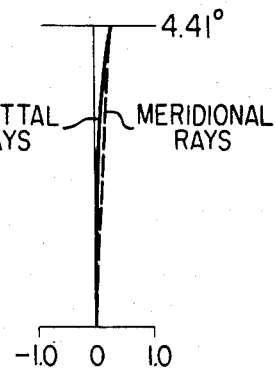
Figure 6C:
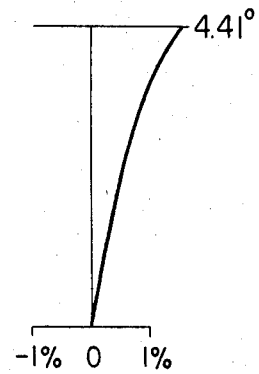

FIG. 4 shows the construction of a RCL according to a second embodiment of the invention. In this embodiment, the shape of the rear conversion lens is made smaller, and moreover, the negative and positive lenses forming the rearward group are cemented together to provide a more simple construction. FIGS. 6A-6C show the various aberrations when the lens of this embodiment is mounted to the same ML as that used with the first embodiment (FIG. 3) to show the performance thereof. Because of the compactness of the lens system and the simplified rearward group, this embodiment is somewhat inferior to the first embodiment in aberrations, but since it is usable in practice, and if the properties of the master lens ML are considered from the point of the versatility of a rear conversion lens, it may be said to furnish good performance.

Numerical data of the embodiments and values representing the basic construction are presented below. In the lists below, $r_1, r_2, r_3, \ldots r_{10}$, represent the radii of curvature of the successive lens surfaces from the object side; $d_1, d_2, d_3, \ldots d_9$, represent the center thicknesses of or separations between the lenses; $n_1, n_2, \ldots n_5$, and $\nu_1, \nu_2, \ldots \nu_5$, represent the refractive indices and Abbe numbers, respectively, of the lenses; and $d_0$ represents the distance between the image plane of the master lens and the surface of the rear conversion lens which is closest to the object. Thus, as a matter of course, $d_0$ is given as a negative value. Also presented is the distance L from the surface of the rear conversion lens which is closest to the object to the final image plane, in order to show the compact shape of the rear conversion lens according to the present invention.

| First Embodiment (FIG. 3) | | | |
|---|---|---|---|
| $d_0 = -48.968$ | | | |
| Forward group: | | | |
| $r_1 = 121.015$ | $d_1 = 4.000$ | $n_1 = 1.59507$ | $\nu_1 = 35.6$ |
| $r_2 = -100.184$ | $d_2 = 2.008$ | | |

-continued

| | | | |
|---|---|---|---|
| $r_3 = -118.420$ | $d_3 = 1.800$ | $n_2 = 1.79668$ | $\nu_2 = 45.4$ |
| $r_4 = 35.500$ | $d_4 = 1.800$ | | |
| $r_5 = 36.800$ | $d_5 = 6.000$ | $n_3 = 1.59507$ | $\nu_3 = 35.6$ |
| $r_6 = -5196.816$ | $d_6 = 4.575$ | | |
| Rearward group: | | | |
| $r_7 = -99.964$ | $d_7 = 1.500$ | $n_4 = 1.79668$ | $\nu_4 = 45.4$ |
| $r_8 = 70.033$ | $d_8 = 0.200$ | | |
| $r_9 = 53.938$ | $d_9 = 9.000$ | $n_5 = 1.51009$ | $\nu_5 = 63.4$ |
| $r_{10} = -180.939$ | | | |

| | |
|---|---|
| Magnification as RCL: | $\beta = 1.4$ |
| Apparent refractive index of the forward group: | $N_1 = -14.47$ |
| Focal length of the forward group: | $f_1 = -886.066$ |
| Apparent refractive index of the rearward group: | $N_2 = 2.59$ |
| Focal length of the rearward group: | $f_2 = -145.988$ |
| Distance between principal points of the forward and the rearward group: | $e = -0.537$ |
| Composite focal length of RCL: | $f_R = -125.403$ |
| Distance from the principal point of the forward group to the image point of the master lens to which the RCL is mounted: | $a = 35.368$ |
| Petzval sum: | $P = -0.00186$ |
| Distance from the lens surface which is most adjacent to the object to the final image plane: | $L = 71.001$ |

Second Embodiment (FIG. 4)

$d_0 = -46.279$

Forward group:

| | | | |
|---|---|---|---|
| $r_1 = 120.000$ | $d_1 = 4.000$ | $n_1 = 1.59507$ | $\nu_1 = 35.6$ |
| $r_2 = -104.724$ | $d_2 = 1.800$ | | |
| $r_3 = -113.000$ | $d_3 = 1.800$ | $n_2 = 1.79668$ | $\nu_2 = 45.4$ |
| $r_4 = 35.800$ | $d_4 = 1.800$ | | |
| $r_5 = 35.500$ | $d_5 = 6.000$ | $n_3 = 1.59507$ | $\nu_3 = 35.6$ |
| $r_6 = 1200.000$ | $d_6 = 2.500$ | | |
| Rearward group: | | | |
| $r_7 = -128.000$ | $d_7 = 1.500$ | $n_4 = 1.79668$ | $\nu_4 = 45.4$ |
| $r_8 = 61.000$ | $d_8 = 9.000$ | $n_5 = 1.51009$ | $\nu_5 = 63.4$ |
| $r_9 = -118.428$ | | | |

| | |
|---|---|
| Magnification as RCL: | $\beta = 1.4$ |
| Effective refractive index of the forward group: | $N_1 = -2.70879$ |
| Focal length of the forward group: | $f_1 = 659.232$ |
| Effective refractive index of the rearward group: | $N_2 = 2.7077$ |
| Focal length of the rearward group: | $f_2 = -157.826$ |
| Distance between principal points of the forward and the rearward group: | $e = -1.160$ |
| Composite focal length of RCL: | $f_R = -127.521$ |
| Distance from the principal point of the forward group to the image point of the master lens to which the RCL is mounted: | $a = 35.497$ |
| Petzval sum: | $P = -0.00178$ |
| Distance from the lens surface which is most adjacent to the object of the final image plane: | $L = 68.516$ |

Finally, numerical data of the master lens used to estimate the performance of the rear conversion lens according to the present invention are given below. It is noted that the master lens forms the subject matter of a copending application entitled "Internal Focussing Telephoto Lens Having Much Larger Aperture Ratio", Ser. No. 48,477/1977; filed Apr. 28, 1977.

Master Lens

Focal length = $f_O$ = 200 mm F/2.0

| | | | |
|---|---|---|---|
| $r_1 = 200.00$ | $d_1 = 14.000$ | $n_1 = 1.50032$ | $\nu_1 = 81.9$ |
| $r_2 = -540.000$ | $d_2 = 0.300$ | | |
| $r_3 = 112.869$ | $d_3 = 15.500$ | $n_2 = 1.50032$ | $\nu_2 = 81.9$ |
| $r_4 = -600.00$ | $d_4 = 0.650$ | | |
| $r_5 = -480.000$ | $d_5 = 5.000$ | $n_3 = 1.75520$ | $\nu_3 = 27.5$ |
| $r_6 = 431.735$ | $d_6 = 41.201$ | | |

Master Lens

Focal length = $f_O$ = 200 mm F/2.0

| | | | |
|---|---|---|---|
| $r_7 = -386.000$ | $d_7 = 7.500$ | $n_4 = 1.79504$ | $\nu_4 = 28.4$ |
| $r_8 = -125.000$ | $d_8 = 2.600$ | $n_5 = 1.46450$ | $\nu_5 = 65.8$ |
| $r_9 = 286.185$ | $d_9 = 21.500$ | | |
| $r_{10} = -161.181$ | $d_{10} = 3.400$ | $n_6 = 1.46450$ | $\nu_6 = 65.8$ |
| $r_{11} = 67.815$ | $d_{11} = 22.9120$ | | |
| $r_{12} = 171.000$ | $d_{12} = 6.500$ | $n_7 = 1.69350$ | $\nu_7 = 53.6$ |
| $r_{13} = -131.975$ | $d_{13} = 2.000$ | | |
| $r_{14} = -213.000$ | $d_{14} = 2.000$ | $n_8 = 1.59507$ | $\nu_8 = 35.6$ |
| $r_{15} = 61.000$ | $d_{15} = 11.000$ | $n_9 = 1.69680$ | $\nu_9 = 55.6$ |
| $r_{16} = -193.237$ | $d_{16} = 22.000$ | | |
| $r_{17} = -130.000$ | $d_{17} = 3.000$ | $n_{10} = 1.46450$ | $\nu_{10} = 65.8$ |
| $r_{18} = -311.705$ | | | |

It is believed that the advantages and improved results of the rear conversion lens of the invention will be apparent from the foregoing description of several preferred embodiments thereof. Various modifications may be made without departing from the spirit and scope of the invention defined in the following claims.

We claim:

1. A rear conversion lens mountable to the image side of a photographic lens to make the composite focal length of the rear conversion lens and the photographic lens greater than the focal length of the photographic lens, comprising:

a divergent forward lens group comprising three components which are, in order from the object side, a biconvex positive lens, a biconcave negative lens with its more curved surface facing the image side, and a positive lens with its more curved surface facing the object side; and a divergent rearward lens group disposed on the image side of said forward lens group and comprising two components which are, in order from the object side, a biconcave negative lens with its more curved surface facing the image side and a biconvex positive lens with its more curved surface facing the object side.

2. A rear conversion lens according to claim 1, satisfying the following conditions:

$$1.5 < \left| \frac{f_{P1}}{f_{P2}} \right| < 3.2;$$

$$1.5 < \left| \frac{f_{P3}}{f_{P2}} \right| < 3.2;$$

$$1.0 < \left| \frac{f_{P5}}{f_{P4}} \right| < 2.5;$$

$$-0.2 < q_1 < 0.1;$$

$$0.4 < q_3 < 2.0;$$

$$0.1 < q_5 < 2.2;$$

$$\frac{n_1 + n_3}{2} \leq n_2;$$

$$n_4 \geq n_6; \text{ and}$$

$$\frac{\nu_1 + \nu_3}{2} \leq \nu_2,$$

where $f_{Pi}$ represents the focal length of the ith lens from the object side (i = 1, 2, ..., 5), $q_i$ represents the shape factor, $n_i$ the refractive index, $\nu_i$ the Abbe number, the shape factor q being defined by $$\frac{r_b + r_a}{r_b - r_a},$$

where $r_a$ represents the radius of curvature of the object side surface of that lens and $r_b$ the radius of curvature of the image side surface of that lens.

3. A rear conversion lens according to claim 1 or 2, wherein said biconcave negative lens and said biconvex positive lens in said rearward group are cemented together.

4. A rear conversion lens according to claim 1, wherein the numerical data are follows:

Forward lens group:

| | | | |
|---|---|---|---|
| $r_1 = 121.015$ | $d_1 = 4.000$ | $n_1 = 1.59507$ | $\nu_1 = 35.6$ |
| $r_2 = -100.184$ | $d_2 = 2.008$ | | |
| $r_3 = -118.420$ | $d_3 = 1.800$ | $n_2 = 1.79668$ | $\nu_2 = 45.4$ |
| $r_4 = 35.500$ | $d_4 = 1.800$ | | |
| $r_5 = 36.800$ | $d_5 = 6.000$ | $n_3 = 1.59507$ | $\nu_3 = 35.6$ |
| $r_6 = -5196.816$ | $d_6 = 4.575$ | | |

Rearward lens group:

| | | | |
|---|---|---|---|
| $r_7 = -99.964$ | $d_7 = 1.500$ | $n_4 = 1.79668$ | $\nu_4 = 45.4$ |
| $r_8 = 70.033$ | $d_8 = 0.200$ | | |
| $r_9 = 53.938$ | $d_9 = 9.000$ | $n_5 = 1.51009$ | $\nu_5 = 63.4$ |
| $r_{10} = -180.939$ | | | | where $r_1, r_2, r_3, \ldots r_{10}$, represent the radii of curvature of the successive lens surfaces from the object side; $d_1, d_2, d_3, \ldots d_9$, represent the center thicknesses of or separations between the lenses; $n_1, n_2, \ldots n_5$, and $\nu_1, \nu_2, \ldots \nu_5$, represent the refractive indices and Abbe numbers, respectively, of the lenses:

| | |
|---|---|
| Distance between the image plane of the photographic lens and the surface of said rear conversion lens closest to the object | $d_O = -48.968$ |
| Magnification of said rear conversion lens | $\beta = 1.4$ |
| Apparent refractive index of the forward lens group | $N_1 = -14.47$ |
| Focal length of the forward lens group | $f_1 = -886.066$ |
| Apparent refractive index of the rearward lens group | $N_2 = 2.59$ |
| Focal length of the rearward lens group | $f_2 = -145.988$ |
| Distance between principal points of said forward and said rearward lens groups | $e = -0.537$ |
| Composite focal length of the rear conversion lens | $f_R = -125.403$ |
| Distance from the principal point of the forward lens group to the image point of the photographic lens | $a = 35.368$ |
| Petzval sum | $P = -0.00186$ |
| Distance from the lens surface which is most adjacent to the object to the final image plane | $L = 71.001$ |

5. A rear conversion lens according to claim 1, wherein the numerical data are as follows:

Forward group:

| | | | |
|---|---|---|---|
| $r_1 = 120.000$ | $d_1 = 4.000$ | $n_1 = 1.59507$ | $\nu_1 = 35.6$ |
| $r_2 = -104.724$ | $d_2 = 1.800$ | | |
| $r_3 = -113.000$ | $d_3 = 1.800$ | $n_2 = 1.79668$ | $\nu_2 = 45.4$ |
| $r_4 = 35.800$ | $d_4 = 1.800$ | | |
| $r_5 = 35.500$ | $d_5 = 6.000$ | $n_3 = 1.59507$ | $\nu_3 = 35.6$ |
| $r_6 = 1200.000$ | $d_6 = 2.500$ | | |

Rearward group:

| | | | |
|---|---|---|---|
| $r_7 = -128.000$ | $d_7 = 1.500$ | $n_4 = 1.79668$ | $\nu_4 = 45.4$ |
| $r_8 = 61.000$ | $d_8 = 9.000$ | $n_5 = 1.51009$ | $\nu_5 = 63.4$ |
| $r_9 = -118.428$, | | | | where $r_1, r_2, r_3, \ldots r_{10}$, represent the radii of curvature of the successive lens surfaces from the object side; $d_1, d_2, d_3, \ldots d_9$, represent the center thicknesses of or separations between the lenses; $n_1, n_2, \ldots n_5$, and $\nu_1, \nu_2, \ldots \nu_5$, represent the refractive indices and Abbe numbers, respectively, of the lenses:

| | |
|---|---|
| Distance between the image plane of the photographic lens and the surface of said rear conversion lens closest to the object | $d_0 = -46.279$ |
| Magnification of said rear conversion lens | $\beta = 1.4$ |
| Apparent refractive index of the forward lens group | $N_1 = -2.70879$ |
| Focal length of the forward lens group | $f_1 = -659.232$ |
| Apparent refractive index of the rearward lens group | $N_2 = 2.7077$ |
| Focal length of the rearward lens group | $f_2 = -157.826$ |
| Distance between principal points of said forward and said rearward lens groups | $e = -1.160$ |
| Composite focal length of the rear conversion lens | $f_R = -127.521$ |
| Distance from the principal point of the forward lens group to the image point of the photographic lens | $a = 35.497$ |
| Petzval sum | $P = -0.00178$ |
| Distance from the lens surface which is most adjacent to the object to the final image plane | $L = 68.516$ |

* * * * *